United States Patent [19]

Kerrey et al.

[11] Patent Number: 4,760,637

[45] Date of Patent: Aug. 2, 1988

[54] REDUCED STRESS FUEL ASSEMBLY FABRICATION APPARATUS AND METHOD

[75] Inventors: John S. Kerrey; John H. Smith, both of Columbia, S.C.

[73] Assignee: Westinghouse Electric Corp., Pittsburgh, Pa.

[21] Appl. No.: 46,328

[22] Filed: May 6, 1987

[51] Int. Cl.$^4$ .................. B23P 19/00; G21C 21/00
[52] U.S. Cl. ............................ 29/723; 29/241; 29/281.1; 376/261
[58] Field of Search ........... 376/261, 260; 29/400 N, 29/723, 700, 281.1, 433, 241; 269/152, 45

[56] References Cited

U.S. PATENT DOCUMENTS

| | | | |
|---|---|---|---|
| 2,799,920 | 7/1957 | Hansen | 269/152 |
| 3,564,678 | 2/1971 | Nash | 29/1.11 |
| 3,748,713 | 7/1973 | Tindale et al. | 29/200 P |
| 3,789,648 | 2/1974 | Ames | 72/316 |
| 3,824,668 | 7/1974 | Wightman | 29/202 D |
| 4,175,318 | 11/1979 | Matsuura et al. | 29/723 |
| 4,474,398 | 10/1984 | Tolino et al. | 376/261 |
| 4,543,711 | 10/1985 | Wada et al. | 29/281.1 |
| 4,558,504 | 12/1985 | Le Pargneux et al. | 29/452 |
| 4,568,013 | 2/1986 | Morisot et al. | 228/45 |
| 4,625,396 | 12/1986 | Ahmed et al. | 29/723 |
| 4,639,993 | 2/1987 | Kapoor | 376/261 |
| 4,649,632 | 3/1987 | Schoenig, Jr. et al. | 29/723 |
| 4,653,180 | 3/1987 | Le Pargneux et al. | 29/723 |

FOREIGN PATENT DOCUMENTS

| | | | |
|---|---|---|---|
| 2550650 | 2/1985 | France | 376/261 |
| 0054198 | 11/1986 | Japan | 376/261 |

Primary Examiner—Deborah L. Kyle
Assistant Examiner—Daniel Wasil

[57] ABSTRACT

A fuel assembly fabrication apparatus includes a stationary support fixture and a slide fixture mounted to one end portion thereof for movement therealong. Clamp structures are disposed in spaced relation longitudinally along the stationary support fixture. One clamp structure is mounted on the movable slide fixture and supports a top nozzle and an uppermost one of a plurality of grids of a fuel assembly. The remaining clamp structures are mounted on the stationary support fixture and support a bottom nozzle and the remaining grids. The clamp structures respectively support the top nozzle and uppermost grid and the bottom nozzle and remaining grids in generally parallel relationship with passageways defined in the top and bottom nozzles and sleeves connected on the grids being aligned for slidably receiving therethrough a plurality of guide thimbles and an instrumentation tube of the fuel assembly for attachment to the nozzles and grid sleeves. Once the guide thimbles and instrumentation tube are installed, the bottom nozzle and grid sleeves are connected thereto beginning at the lowermost grid and working up to the uppermost grid. Extension sleeves are installed through the passageways of the top nozzle and in overlapping relation with the upper ends of the guide thimbles. After attachment to the top nozzle, the extension sleeves are then attached to the guide thimbles.

8 Claims, 3 Drawing Sheets

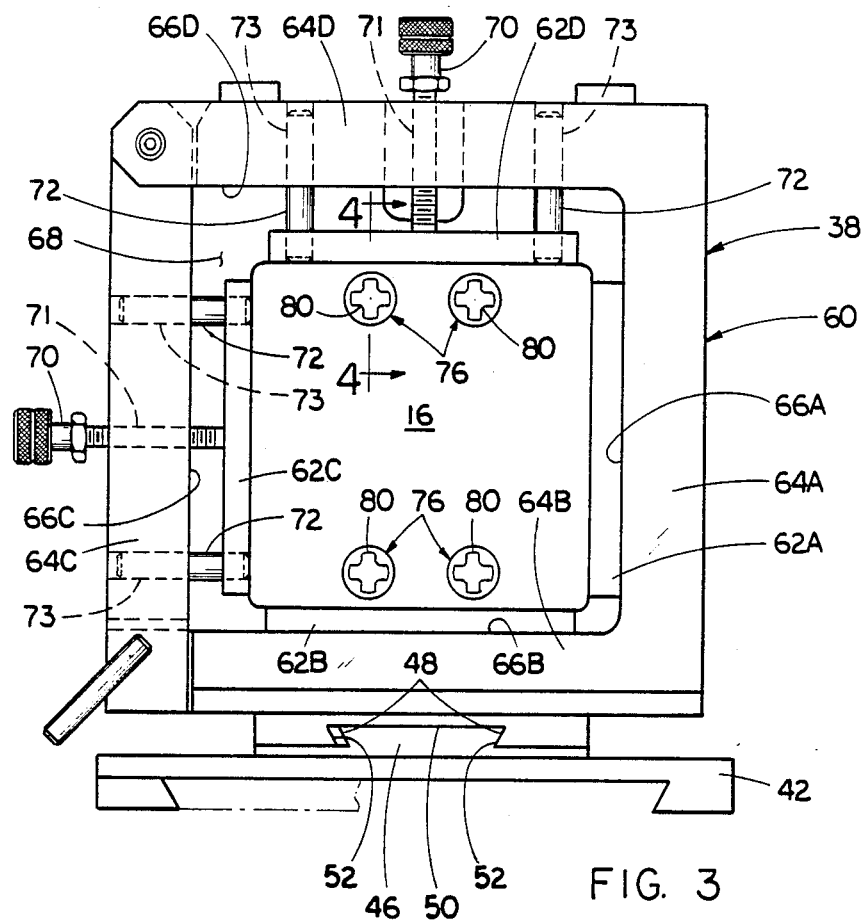
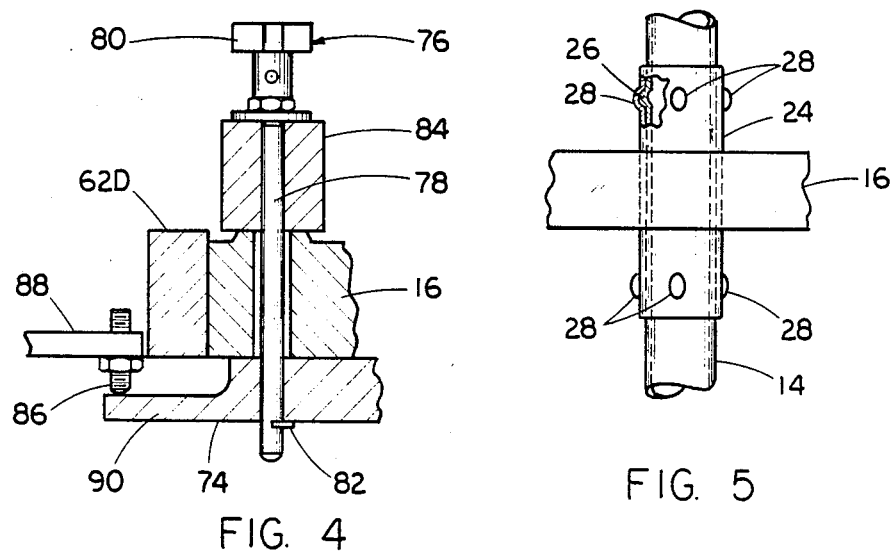
FIG. 3
FIG. 4
FIG. 5

REDUCED STRESS FUEL ASSEMBLY FABRICATION APPARATUS AND METHOD

BACKGROUND OF THE INVENTION

1. Field of the Invention

The present invention relates generally to fuel assemblies for use in nuclear reactors and, more particularly, is concerned with an apparatus and method for fabricating fuel assemblies with reduced residual built-in stresses.

2. Description of the Prior Art

A typical pressurized water nuclear reactor contains a large number of fuel assemblies in its core. Each fuel assembly in the reactor core has the same construction. Basically, a fuel assembly is composed of a bottom nozzle, a top nozzle, an instrumentation tube and pluralities of guide thimbles, fuel rods and grids. The structural skeleton of the fuel assembly is composed of the bottom and top nozzles and the plurality of guide thimbles which extend vertically between the bottom and top nozzles and rigidly interconnect them.

The grids and fuel rods are not structural parts of the fuel assembly but instead are respectively supported directly and indirectly by the guide thimbles. The grids are attached in axially spaced positions along the guide thimbles such that a multiplicity of cells defined by interleaved straps of the respective grids are disposed in vertical alignment. The fuel rods are supported in an organized and transversely spaced array in the vertically aligned cells of the transverse grids by springs and dimples on the straps which extend into the cells.

The grids have short sleeves which extend above and below the interleaved straps for receiving the guide thimbles and providing means for attaching the grids thereto. Typically, concentric portions of the guide thimbles and grid sleeves are deformed or bulged together, such as by plastic expansion, to form mechanical joints therebetween above and below the respective grids. During this process, unequal shortening of the guide thimbles can occur. Unequal shortening of the respective guide thimbles can result in a skewed or bowed fuel assembly skeleton and lock-in of axial stresses between the guide thimbles and in the fuel assembly as a whole.

Consequently, a need exists for an approach to fuel assembly fabrication which will avoid skewing or bowing of the fuel assembly skeleton.

SUMMARY OF THE INVENTION

The present invention provides an apparatus and method for fuel assembly fabrication which are designed to satisfy the aforementioned needs. The apparatus of the present invention provides clamps for maintaining bottom and top nozzles and grids of the fuel assembly in perpendicular relationships to the longitudinal axis of the fuel assembly being fabricated, while permitting axial movement of the guide thimbles during formation of the joints between the guide thimbles and the grid sleeves. Such freedom of movement of the guide thimbles compensates for differences in reductions of the lengths thereof which inherently occur during formaton of the joints. Thus, the loads are more balanced during joint formation resulting in the fabrication of a straighter, more stress-free fuel assembly.

Furthermore, in the fuel assembly fabrication method of the present invention the guide thimbles are first attached to the bottom nozzle and, then, to the grids sleeves below the uppermost one, starting at the lowermost one. Lastly, the guide thimbles are attached to sleeves which are associated with the uppermost grid and already attached to the top nozzle. The above procedure allows fabrication of the fuel assembly in a manner which accommodates differential shortening of the guide thimbles relative to one another and allows establishment of a desired uniform length between the uppermost grid and the top nozzle to facilitate carrying out reconstitution of the fuel assembly later on.

Accordingly, the present invention is directed to a fuel assembly fabrication apparatus, comprising the combination of: (a) an elongated stationary support fixture; (b) a slide fixture shorter in length than the support fixture and mounted to one end portion thereof for movement therealong; and (c) a plurality of clamp structures disposed in spaced relation longitudinally along the stationary support fixture, one of the clamp structures being mounted on the movable slide fixture and adapted to support a top nozzle and an uppermost one of a plurality of grids of a fuel assembly, the remaining ones of the clamp structures being mounted on the stationary support fixture and adapted to support the bottom nozzle and each of the remaining grids of the fuel assembly. The one clamp structure and remaining clamp structures are adapted to respectively support the top nozzle and uppermost grid and the bottom nozzle and remaining grids in generally parallel relationship with a plurality of passageways defined in the top and bottom nozzles and a plurality of sleeves connected on the grids being aligned for slidably receiving therethrough a plurality of elongated tubular members of the fuel assembly for attachment to the nozzles and grid sleeves.

Also, the present invention is directed to a fuel assembly fabrication method, comprising in combination the steps of: (a) installing a bottom nozzle and a plurality of grids except for an uppermost one of the grids in generally parallel spaced relationship to one another such that a plurality of passageways defined in the bottom nozzle are aligned with a plurality of sleeves mounted on the grids; (b) installing elongated tubular members of the fuel assembly through the respective aligned passageways of the bottom nozzle and sleeves of the grids; (c) installing a top nozzle and uppermost one of the grids in a uniform spaced and generally parallel relationship to one another with a plurality of passageways of the top nozzle aligned with a plurality of sleeves of the uppermost grid and with the uppermost grid sleeves receiving the tubular members therethrough; (d) attaching the elongated tubular members first to the bottom nozzle and then to the sleeves of the grids beginning at the lowermost grid and working successive toward the uppermost grid; and (e) installing extension sleeves through the passageways of the top nozzle and in overlapping relation with the tubular members; (f) attaching the extension sleeves to the top nozzle; and (g) attaching the extension sleeves to the tubular members.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is an end elevational view of one of the clamp structures of the fabrication apparatus of FIG. 2.

FIG. 4 is an enlarged fragmentary sectional view taken along line 4—4 of FIG. 3 and rotated counterclockwise ninety degrees.

FIG. 5 is an elevational view of a typical joint between a grid sleeve and guide thimble of the fuel assembly.

DETAILED DESCRIPTION OF THE INVENTION

Figure 1:
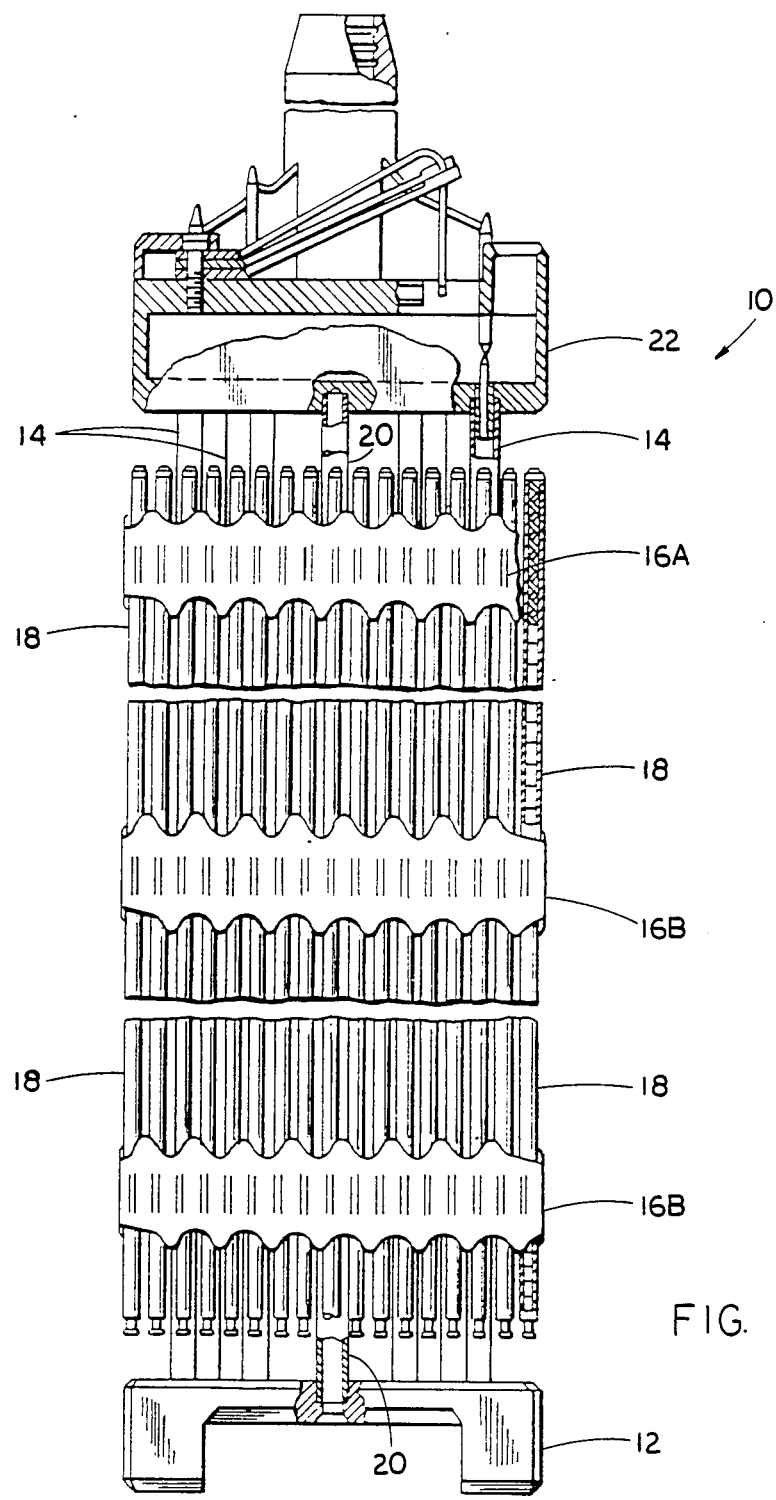
FIG. 1 is an elevational view, partly in section, of a fuel assembly capable of being fabricated by the apparatus and method of the present invention.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a completed fuel assembly, represented in vertically foreshortened form and being generally designated by the number 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the fuel assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

The structural skeleton of the fuel assembly 10 is composed of the bottom and top nozzles 12,22 and the plurality of guide thimbles 14 which extend verticaly between the bottom and top nozzles and rigidly interconnect them. The grids 16 and fuel rods 18 are not structural parts of the fuel assembly but instead are respectively supported directly and indirectly by the guide thimbles 14. The grids 16 are attached in axially spaced positions along the guide thimbles 14. Each grid 16 has a plurality of short sleeves 24, one of which is shown in FIG. 5, arranged in a pattern which matches that of the guide thimbles 14. The sleeves 24 extend above and below the grid 16 for receiving the guide thimbles 14 therethrough and provide means for attaching the grid 16 thereto. Typically, concentric portions 26,28 of the guide thimble 14 and grid sleeve 24 are deformed or bulged together, such as by plastic expansion, to form mechanical joints 30 therebetween above and below the grid 16.

FUEL ASSEMBLY FABRICATION APPARATUS

Figure 2:
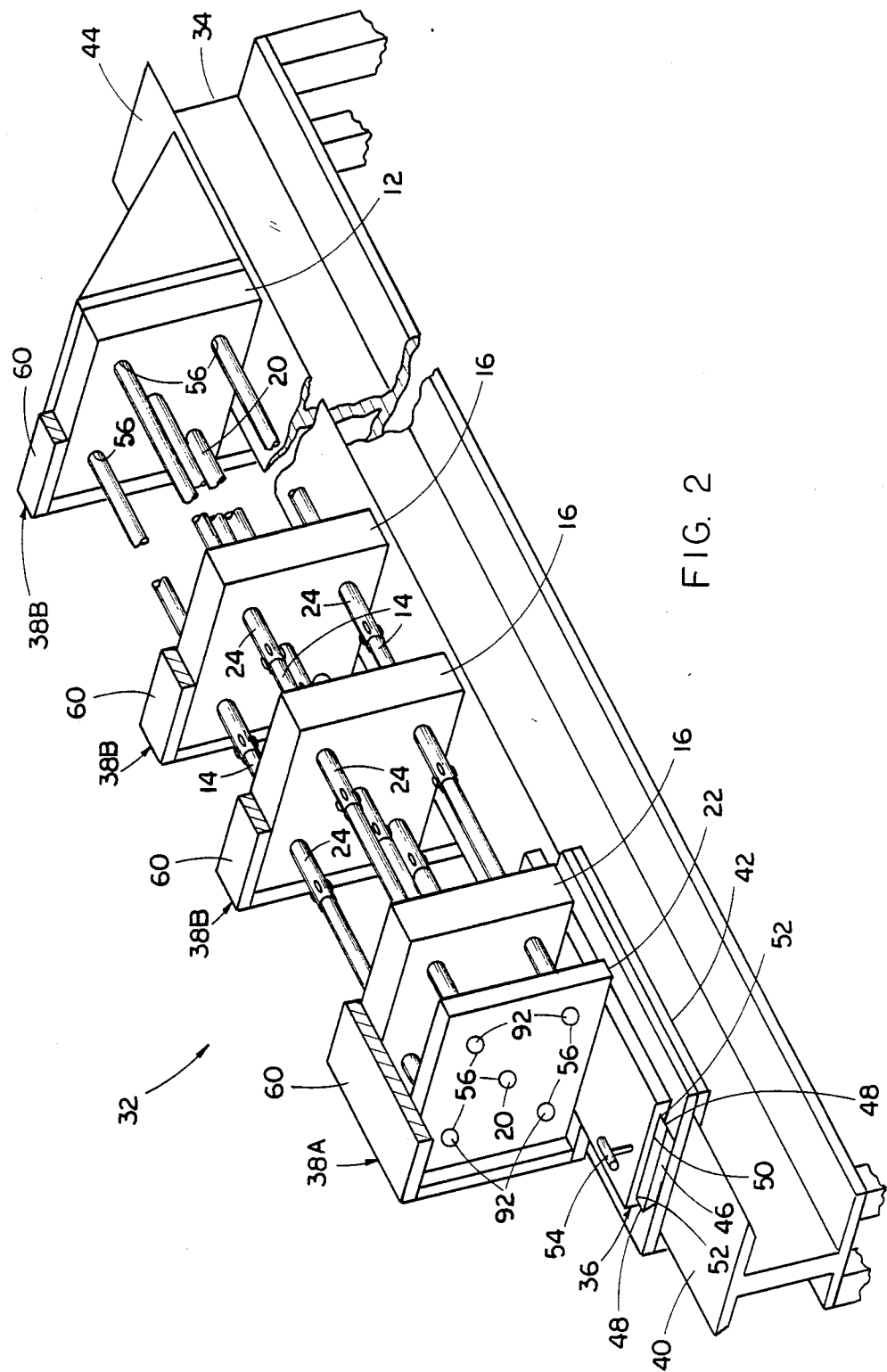
FIG. 2 is a schematical perspective view of the fuel assembly fabrication apparatus of the present invention.

Referring now to FIGS. 2-4, there is shown the fuel assembly fabrication apparatus of the present invention, being generally indicated by the numeral 32. In its basic components, the fabrication apparatus 32 includes an elongated stationary support fixture 34, a side fixture 36, and a plurality of clamp structures 38. The slide fixture 36 is shorter in length than the support fixture 34 and mounted to one end portion 40 thereof for reciprocatory movement therealong in the direction of the double arrows.

In particular, as seen in FIGS. 2 and 3, a platform 42 is stationarily mounted to an upper surface 44 of the support fixture 34 at its one end portion 40. A guide plate 46 having opposite lateral dovetail edges 48 is fixed on the platform 42 and received in a recess 50 formed in the underside slide fixture 36. The recess 50 of the slide fixture 36 has complementarily-shaped opposite lateral dovetail grooves 52 which receive the dovetail edges 48 of the plate 46. Means in the form of a latch pin 54 is mounted in the slide fixture 36 and insertable into and retractable from the guide plate 46 for latching and releasing the slide fixture 36 to and from the stationary support fixture 34. When the latch pin 54 is lifted to release the slide fixture 36 from attachment to the guide plate 46, the slide fixture 36 is then freely movable along the end portion 40 of the support fixture 34.

The clamp structures 38 are disposed in spaced relation longitudinally along the stationary support fixture 34. One of the clamp structures 38A is mounted on the movable slide fixture 36 and adapted to support at a preset distance apart from one another the top nozzle 22 and an uppermost one of the plurality of grids 16A of the fuel assembly 10. The remaining ones of the clamp structures 38B are mounted on the upper surface 44 of the stationary support fixture 34 and adapted to support the bottom nozzle 12 and each of the remaining grids 16B of the fuel assembly 10. The one clamp structure 38A and the remaining clamp structures 38B are adapted to respectively support the top nozzle 22 and uppermost grid 16A and the bottom nozzle 12 and remaining grids 16B in generally parallel relationship. In such relationship, a plurality of passageways 56 defined in the top and bottom nozzles 12,22 and the plurality of sleeves 24 connected on the grids 16 are aligned so that the plurality of guide thimbles 14 and the instrumentation tube 20 can be slidably inserted therethrough for attachment to the nozzles 12,22 and the grid sleeves 24.

Each of the clamp structures 38 basically includes a framework 60 and clamp members 62A-D disposed thereon. The framework 60 is composed of rectangularly-arranged and interconnected side portions 64A-D having inner edges 66A-D defining a central opening 68. It will be noted that the clamp structure 38A which mounts the top nozzle 22 and the uppermost grid 16A is greater in length than the remaining clamp structures 38B. The clamp members 62A-D are disposed on the framework 60 about the central opening 66 for supporting therebetween one of the grids 16 and nozzles 12,22 in the opening 68. A first pair of the clamp members 62A,62B are stationarily mounted to a first pair of adjacent ones of the framework side portions 64A,64B along the respective inner edges 66A,66B thereof. A second pair of the clamp members 62C,62D are movably mounted to a second pair of adjacent ones of the framework side portions 64C,64D along the respective inner edges 66C,66D thereof and in opposing relation to the first pair of the clamp members 62A,62B. Each of the clamp members 62C,62D of the second pair are movable toward and away from opposing ones of the clamp members 62A,62B of the first pair thereof for supporting therebetween one of the grids 16 and nozzles 12,22 in the opening 68.

Means in the form of a threaded adjustment member 70 and a pair of guide pins 72 are mounted respectively through a threaded bore 71 and guide passages 73 defined in the respective framework side portions 64C,64D and connected at their inner ends to the movable clamp members 62C,62D. The adjustment member 70 is aligned with the center of each movable clamp member 62C,62D, and the guide pins 72 are aligned with respective opposite end portions of each clamp member 62C,62D and displaced laterally in opposite directions from the adjustment member 70. By threading of the adjustment member 70 into and from the bore 71, the movable clamp members 62C,62D can be moved in rectilinear fashion toward and away from the opposing stationary clamp members 62A,62B to clamp therebetween respective ones of the grids 16 and nozzles 12,22 in the framework opening 68.

As also seen in FIGS. 2 and 4, each of the grids 16 is aligned in perpendicular relationship to the upper surface 44 of the support fixture 34 and in parallel relationship to one another by use of an annular plate 74 mounted along one face of the grid by a plurality of connectors 76. Each connector 76 includes an elongated pin 78 threaded at one end to receive a knob 80 and having a transverse aperture at its opposite end which receives a key 82. A spacer 84 is installed about the pin 78 and engaged the opposite face of the grid. A plurality of gauge screws 86 are mounted on brackets 88 fixed at spaced locations about and to the framework 60 adjacent to the annular plate 70 so as to overlie the peripheral edge 90 of the plate 70. The screws 86 are threadably adjusted relative to the edge 90 of the plate 70 for aligning the plate and thus the grid 16 in perpendicular relation, within the respective clamp structure 38, to the support fixture 34.

In the method of using the apparatus 32 to fabricate the fuel assembly 10, the bottom nozzle 12 and the grids 16B (minus the uppermost one 16A) are first installed in their respective clamp structures 38B in generally parallel spaced relationship to one another such that the passageways 56 defined in the bottom nozzle 12 are aligned with the sleeves 24 mounted on the grids 14B. Next, the guide thimbles 16 and instrumentation tube 20 are installed through the respective aligned passageways 56 of the bottom nozzle 12 and sleeves 24 of the grids 16B. Then, the top nozzle 22 and uppermost one of the grids 16A are installed at the fixed spacing and generally parallel relationship to one another in the top clamp structure 38A with the passageway 56 of the top nozzle 22 aligned with the sleeves 24 of the uppermost grid 16A and with the uppermost grid sleeves receiving the guide thimbles 14 and the instrumentation tube 20 therethrough. Short extension sleeves 92 are now installed through the passageways 56 of the top nozzle 22 and in overlapping relation with the upper ends of the guide thimbles 14. After installation of all the aforementioned components, all clamp structures 38 are tightened.

The guide thimbles 14 and instrumentation tube 20 are first attached, such as by using known threaded fasteners (not shown), to the bottom nozzle 12. Then, they are attached to the sleeves 24 of the grids 16 using an internal bulging tool (not shown), beginning at the lowermost grid 16B and working successively up toward the uppermost grid 16A, It should be pointed out that in some fuel assemblies, the lowermost grid is not actually attached to the guide thimbles 14, but instead rest on spacer sleeves surrounding the guide thimbles above the bottom nozzle 12. FIG. 5 illustrates typical mechanical joints 30 formed above and below the grid 16 between concentric portions 26,28 of the guide thimble 14 and grid sleeves 24. Alternatively, only one of the joints 30 either above or below the grid 16 could be provided instead of both of them.

In preparation for attaching the guide thimbles 14 to the grid sleeves 24 of the grids 16B, the pin 54 is actuated to release the slide fixture 36 from the stationary support fixture 34. The slide fixture 36 is then allowed to move freely along the stationary fixture 34 during the attaching of the guide thimbles 14 to the grid sleeves 24.

Next, the extension sleeves 92 are attached in a conventional manner to the top nozzle 22. Finally, the extension sleeves 92 are bulge fitted to the guide thimbles 14 above the uppermost grid 16A.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. In a fuel assembly fabrication apparatus, the combination comprising:
    (a) an elongated stationary support fixture;
    (b) a slide fixture shorter in length than said support fixture and mounted to one end portion thereof for movement therealong; and
    (c) a plurality of clamp structures disposed in spaced relation longitudinally along said stationary support fixture, one of said clamp structures being mounted on said movable slide fixture and adapted to support a top nozzle and an uppermost one of a plurality of grids of a fuel assembly, the remaining clamp structures in said plurality thereof being mounted on said stationary support fixture and adapted to support said bottom nozzle and each of the remaining grids of the fuel assembly;
    (d) said one and said remaining clamp structures being adapted to respectively support the top nozzle and uppermost grid and the bottom nozzle and remaining grids in generally parallel relationship with a plurality of passageways defined in the top and bottom nozzles and a plurality of sleeves connected on the grids being aligned for slidably receiving therethrough a plurality of elongated tubular members of the fuel assembly for attachment to the nozzles and grid sleeves;
    (e) each of said clamp structures including
        (i) a framework defining a central opening,
        (ii) clamp members being disposed on said framework about the perimeter of said central opening for supporting therebetween one of said grids and nozzle in said opening, and
        (iii) means mounting at least some of said clamp members to said framework for movement toward and away from others of said clamp members for clamping therebetween one of said grids and nozzles in said opening.

2. In a fuel assembly fabrication apparatus, the combination comprising:
(a) an elongated stationary support fixture;
(b) a slide fixture shorter in length than said support fixture and mounted to one end portion thereof for movement therealong; and
(c) a plurality of clamp structures disposed in spaced relation longitudinally along said stationary support fixture, one of said clamp structures being mounted on said movable slide fixture and adapted to support a top nozzle and an uppermost one of a plurality of grids of a fuel assembly, the remaining clamp structures in the plurality thereof being mounted on said stationary support fixture and adapted to support said bottom nozzle and each of the remaining grids of the fuel assembly;
(d) said one and said remaining clamp structures being adapted to respectively support the top nozzle and uppermost grid and the bottom nozzle and remaining grids in generally parallel relationship with a plurality of passageways defined in the top and bottom nozzles and a plurality of sleeves connected on the grids being aligned for slidably receiving therethrough a plurality of elongated tubular members of the fuel assembly for attachment to the nozzles and grid sleeves;
(e) each of said clamp structures including
  (i) a framework composed of rectangularly-arranged side portions having inner edges defining a central opening, and
  (ii) a first pair of clamp members being stationarily mounted to a first pair of adjacent ones of said framework side portions along said respective inner edges thereof.

3. The fabrication apparatus as recited in claim 2, wherein each of said clamp structures also includes:
a second pair of clamp members being movably mounted to a second pair of adjacent ones of said framework side portions along said respective inner edges thereof and in opposing relation to said first pair of claim members, each of said clamp members of said second pair being movable toward and away from opposing ones of said clamp members of said first pair thereof for supporting therebetween one of said grids and nozzles in said opening.

4. The fabrication apparatus as recited in claim 3, wherein each of said clamp structures yet further includes:
guide means mounting each of said clamp members of said second pair thereof to respective ones of said second pair of framework side portions for rectilinear movement toward and away from opposing ones of said clamp members of said first pair thereof.

5. The fabrication apparatus as recited in claim 4, wherein each of said clamp structures still further includes:
adjustment means mounting each of said clamp members of said second pair thereof to respective ones of said second pair of framework side portions and being operable for causing said rectilinear movement of said clamp members to clamp therebetween one of said grids and nozzles in said opening.

6. In a fuel assembly fabrication apparatus, the combination comprising:
(a) an elongated stationary support fixture;
(b) a slide fixture shorter in length than said support fixture and mounted to one end portion thereof for movement therealong;
(c) a plurality of claim structures disposed in spaced relation longitudinally along said stationary support fixture, one of said clamp structures being mounted on said movable slide fixture and adapted to support a top nozzle and an uppermost one of a plurality of grids of a fuel assembly, the remaining claim structures in said plurality thereof being mounted on said stationary support fixture and adapted to support said bottom nozzle and each of the remaining grids of the fuel assembly;
(d) said one and said remaining claim structures being adapted to respectively support the top nozzle and uppermost grid and the bottom nozzle and remaining grids in generally parallel relationship with a plurality of passageways defined in the top and bottom nozzles and a plurality of sleeves connected on the grids being aligned for slidably receiving therethrough a plurality of elongated tubular members of the fuel assembly for attachment to the nozzles and grid sleeves; and
(e) means for latching and releasing said movable slide fixture to and from said stationary support fixture.

7. The fabrication apparatus as recited in claim 6, wherein each of said clamp structures include:
a framework defining a central opening; and
clamp members being disposed on said framework about the perimeter of said central opening for supporting therebetween one of said grids and nozzles in said opening.

8. The fabrication apparatus as recited in claim 7, wherein each of said clamp structures further includes:
means mounting at least some of said clamp members to said framework for movement toward and away from others of said clamp members for clamping therebetween one of said grids and nozzles in said opening.

* * * * *